H. S. HOXIE.
Plow Colter.
No. 77,616. Patented May 5, 1868.
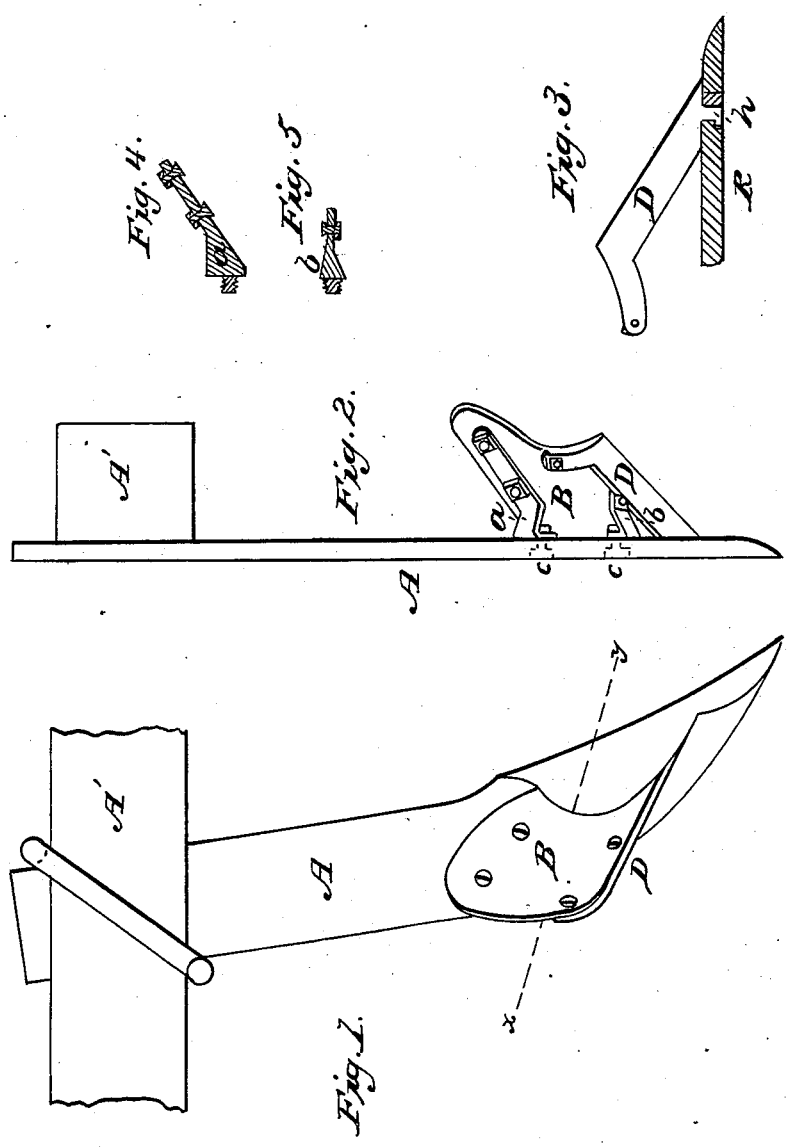

United States Patent Office.

HORACE S. HOXIE, OF ADRIAN, MICHIGAN.

Letters Patent No. 77,616, dated May 5, 1868.

IMPROVEMENT IN PLOUGH-COULTER.

*The Schedule referred to in these Letters Patent and making part of the same.*

TO ALL WHOM IT MAY CONCERN:

Be it known that I, HORACE S. HOXIE, of Adrian, county of Lenawee, and State of Michigan, have invented a new and useful Improvement in Plough-Coulters; and I do hereby declare the following to be a full, clear, and exact description, which will enable others skilled in the art to make and use my invention, reference being had to the accompanying drawings, and to the letters of reference marked thereon, making a part of this specification.

Like letters refer to like parts.

The nature of my invention consists in providing the coulters of agricultural ploughs with either a permanent or an adjustable mould-board, in such a manner that when the plough is drawn along, the mould-board on the coulter turns up a thin and narrow furrow, which is afterwards turned under by the plough, thus completely burying all the stubble, turf, and other surface-matter. In the drawings—

Figure 1 represents a plough-coulter, having an adjustable mould-board attached, and embodies my invention.

Figure 2 represents a back view of such a coulter and mould-board, when viewed in the direction of $xy$, fig. 1.

Figure 3 represents a sectional view of the brace D, and the mode of attaching it to the coulter.

Figures 4 and 5 represent side views of modified forms of the other two braces, $a$ and $b$, shown in fig. 2.

A represents the coulter.

A' represents the plough-beam.

B represents the mould-board.

D represents the lower brace.

$a$ and $b$, in figs. 4 and 5, are but modified forms of the braces, represented by like letters in fig. 2.

The mould-board B is constructed of steel, bent or curved in the proper form, and secured to the braces $a$, $b$, and D by short bolts, and the braces $a$ and $b$ are bolted to the coulter A by the bolts $cc$, fig. 2; or the coulter A is tapped, and the braces $a$ and $b$, formed as shown in figs. 4 and 5, are screwed directly into it.

The lower end of the brace D is to be secured to the coulter A by means of a hooked tenon, $h$, fitting into a corresponding slot in the coulter, a plug being driven into the slot forward of the tenon, to prevent it from sliding ahead. But in regard to the use of this brace D, I do not wish to be confined to the employment of a hooked tenon to secure it to the coulter; but my design is (if it is desirable) to tap the coulter A, and screw this brace D also into the coulter, in the same way that the braces $a$ and $b$ (figs. 4 and 5) are screwed to the coulter.

I have designed also (if desirable) not to use the braces $a$, $b$, or D at all, but to construct the coulter A and mould-board B both in one piece, by welding them together, retaining, however, the same form for the mould-board B.

The mould-board B is placed at any desirable height above the point of the coulter, so as to turn up a thin and narrow furrow of the surface-earth, and throw it over on the ground, to be thrown under by the plough the whole to be attached to (and if desirable, be detachable from,) any coulter of the common form.

Having thus described my invention, what I claim as new, and desire to secure by Letters Patent, is—

Claim.

1. I claim, in combination with the coulter A, the braces $a$, $b$, and D, mould-board B, tenon $h$, all constructed in the manner set forth and described.

2. I claim the combination of the mould-board B and coulter A, when both are made in one piece, or welded together in the manner set forth and described.

HORACE S. HOXIE.

Witnesses:
JAMES CLARK,
KATE HILL.